US010895743B2

United States Patent
Dausmann

(10) Patent No.: US 10,895,743 B2
(45) Date of Patent: Jan. 19, 2021

(54) DISPLAY APPARATUS FOR SUPERIMPOSING A VIRTUAL IMAGE INTO THE FIELD OF VISION OF A USER

(71) Applicant: Hologram Industries Research GmbH, Ottersberg/Pliening (DE)

(72) Inventor: Günther Dausmann, Grasbrunn (DE)

(73) Assignee: Hologram Industries Research GmbH, Ottersberg/Pliening (DE)

( * ) Notice: Subject to any disclaimer, the term of this patent is extended or adjusted under 35 U.S.C. 154(b) by 213 days.

(21) Appl. No.: 16/313,638

(22) PCT Filed: Jun. 26, 2017

(86) PCT No.: PCT/EP2017/065616
§ 371 (c)(1),
(2) Date: Dec. 27, 2018

(87) PCT Pub. No.: WO2018/001917
PCT Pub. Date: Jan. 4, 2018

(65) Prior Publication Data
US 2019/0155031 A1    May 23, 2019

(30) Foreign Application Priority Data
Jun. 28, 2016   (DE) .................. 10 2016 111 783

(51) Int. Cl.
*G02B 27/01* (2006.01)
*G02B 27/00* (2006.01)
*B60R 11/00* (2006.01)

(52) U.S. Cl.
CPC ..... *G02B 27/0103* (2013.01); *G02B 27/0093* (2013.01); *G02B 27/0172* (2013.01);
(Continued)

(58) Field of Classification Search
CPC ............ G02B 27/0103; G02B 27/0172; G02B 27/0093; G02B 2027/0105;
(Continued)

(56) References Cited

U.S. PATENT DOCUMENTS 6,353,422 B1   3/2002  Perlman
7,391,574 B2   6/2008  Fredriksson
(Continued)

FOREIGN PATENT DOCUMENTS

DE    2 304 175    8/1973
DE    44 45 555    7/2002
(Continued)

OTHER PUBLICATIONS

German Search Report regarding DE 10 2016 111 783.8, dated Apr. 3, 2017 (3 pages).
(Continued)

*Primary Examiner* — William R Alexander
*Assistant Examiner* — Henry A Duong
(74) *Attorney, Agent, or Firm* — Nixon Peabody LLP

(57) ABSTRACT

The present invention relates to a display apparatus for superimposing a virtual image into the field of vision of a user of the display apparatus, having spectacles for the user and at least one projection device for producing light rays which are transferred by means of an optical unit of the spectacles into a beam path which produces a virtual image for the user. The optical unit may comprise a ground-glass screen or lens array and a holographic optical imaging unit. The ground-glass screen or lens array and holographic optical imaging unit are arranged in such a way that the light rays produced by the projection device are incident on the holographic optical imaging unit through the ground-glass screen or the lens array and are transferred by the holo-
(Continued)

Figure 1:
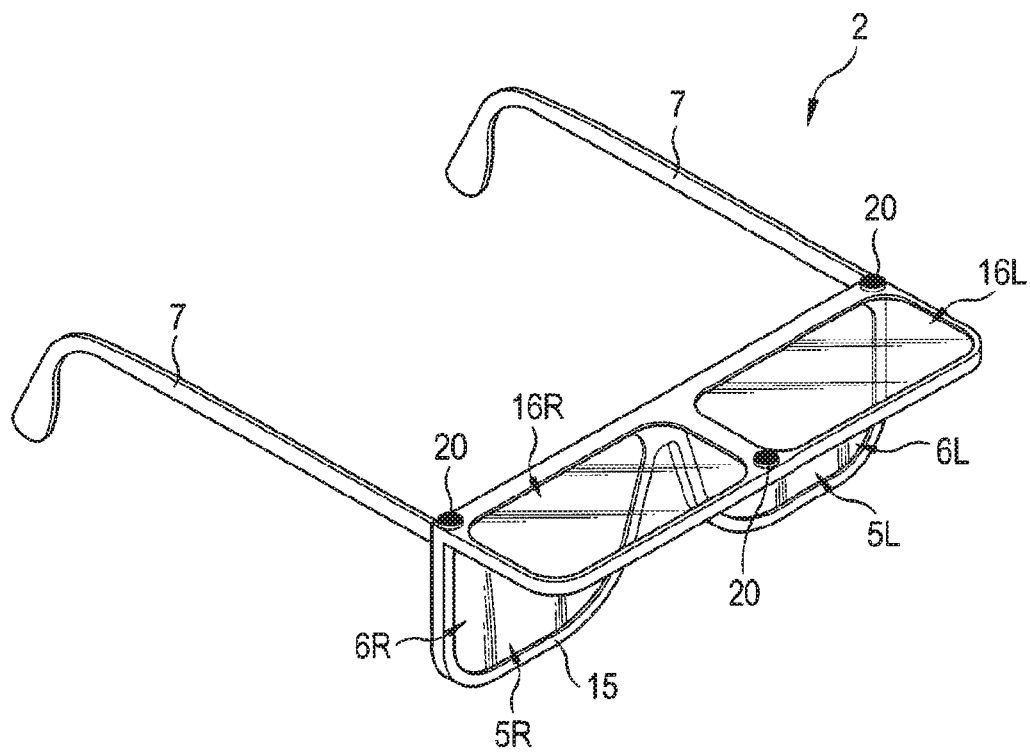

graphic optical imaging unit into the beam path which produces the virtual image for the user.

20 Claims, 3 Drawing Sheets

(52) U.S. Cl.
 CPC ... *B60R 2011/0028* (2013.01); *B60R 2300/20* (2013.01); *B60R 2300/205* (2013.01); *G02B 2027/0105* (2013.01); *G02B 2027/0138* (2013.01); *G02B 2027/0145* (2013.01); *G02B 2027/0174* (2013.01)

(58) Field of Classification Search
 CPC .... G02B 2027/0174; G02B 2027/0145; G02B 2027/0138; G02B 2027/0181; G02B 2027/0183; B60R 2300/20; B60R 2300/205; B60R 2011/0028
 USPC .......................................................... 359/13
 See application file for complete search history.

(56) References Cited

U.S. PATENT DOCUMENTS

| | | |
|---|---|---|
| 2001/0043163 A1 | 11/2001 | Waldern |
| 2007/0019264 A1* | 1/2007 | Tanijiri ............. G02B 27/0172 359/15 |
| 2007/0064311 A1 | 3/2007 | Park |
| 2010/0053729 A1 | 3/2010 | Tilleman |
| 2010/0238414 A1 | 9/2010 | Togino |
| 2013/0222384 A1 | 8/2013 | Futterer |
| 2014/0198262 A1 | 7/2014 | Chuang |

FOREIGN PATENT DOCUMENTS

| | | |
|---|---|---|
| DE | 10 2005 012 011 | 9/2006 |
| DE | 10 2008 024 060 | 11/2009 |
| DE | 10 2011 075 205 | 11/2012 |
| EP | 1 006 375 | 6/2000 |
| JP | 08-320451 | 12/1996 |
| JP | H 11-133885 A | 5/1999 |
| WO | WO 2005/028256 | 3/2005 |

OTHER PUBLICATIONS

PCT International Search Report regarding PCT/EP2017/065616, dated Sep. 29, 2017 (6 pages).

* cited by examiner

DISPLAY APPARATUS FOR SUPERIMPOSING A VIRTUAL IMAGE INTO THE FIELD OF VISION OF A USER

CROSS-REFERENCE TO RELATED APPLICATIONS

This application is a U.S. National Stage of International Application No. PCT/EP2017/065616, filed Jun. 26, 2017, which claims the benefit of German Patent Application No. 10 2016 111 783.8, filed on Jun. 28, 2016, each of which is hereby incorporated herein by reference in its entirety.

The present invention relates to a display apparatus for superimposing a virtual image into the field of vision of a user of the display apparatus according to the preamble of independent claims 1 and 2.

A generic display apparatus comprises spectacles for the user and at least one projection device for producing light rays which are transferred by means of an optical unit of the spectacles into a beam path which produces the virtual image for the user.

A display apparatus of this kind is known from the state of the art. The device developed by Google and distributed under the trademark Google Glass, for example, constitutes a display apparatus according to the preamble of independent claim 1. The device essentially consists of conventional spectacles comprising a relatively broad temple on one side, into which a computer with the computing power of a mid-range smartphone is integrated. The image output occurs via a small projector which is also integrated into the temple and the image of which is mirrored into the user's right eye by means of a prism. The prism is arranged in front of the right lens of the spectacles and only covers a small area of the field of vision. The virtual image superimposed by the projector can therefore only be displayed in a small area of the field of vision. In addition, the relatively thick prism in front of the right lens of the spectacles disturbs the aesthetics and can also be perceived as disturbing by the user. The prism actually allows the light of the surroundings to pass through so that the user can still see the image of reality in the prism area. However, the prism causes aberrations.

Furthermore, so-called virtual reality spectacles are known from the state of the art which capture the image of the surroundings with a camera, combine it with a virtual image and present the combined image to the user by means of a projection device. However, these devices are not spectacles in the actual sense, since the user has no transparent glass in front of his eyes and can therefore only see the image of the surroundings when the projection device is switched on. Due to a possible failure of the projection device, for example due to a power interruption, such systems are therefore not suitable for applications in which the user must always be able to perceive his surroundings for safety reasons.

Furthermore, display apparatuses for the superimposition of a virtual image which do not require spectacles for the user are known from the state of the art. In the automotive sector, for example, such display apparatuses are used as head-up displays to provide the driver with additional information, such as the current speed of the vehicle, directly in his field of vision, without the driver having to look away from the road. Such display apparatuses are described for example in DE 2304175 A, DE 444555502, DE 102005012011 A1, DE 102008024060 A1, and DE 102011075205 A1. The known head-up displays have, among other things, the disadvantage that the area in which the virtual image can be displayed to the user only occupies a small part of the field of vision.

It is an object of the present invention to further develop the display apparatus of the generic type such that the virtual image can be displayed in a large area of the field of vision and no disturbing visual impressions result for the user.

The problem is solved by the features of independent claim 1. Accordingly, in the case of a display apparatus of the generic type, a solution to the problem according to the invention exists, if the optical unit comprises a ground-glass screen and a holographic optical imaging unit, wherein the ground-glass screen and the holographic optical imaging unit are arranged in such a way that the light rays produced by the projection device are incident on the holographic optical imaging unit through the ground-glass screen and are transferred by said holographic optical imaging unit into the beam path which produces the virtual image for the user. Alternatively, the problem is solved by the features of independent claim 2. Accordingly, in a display apparatus of the generic type, a solution to the problem according to the invention also exists, if the optical unit preferably comprises a lens array of microlenses and holographic optical imaging unit, wherein the lens array and the holographic optical imaging unit are arranged in such a way that the light rays produced by the projection device are incident on the holographic optical imaging unit through the lens array and are transferred by the said holographic optical imaging unit into the beam path which produces the virtual image for the user. In this solution according to the invention, the projection device produces an image directly on the lens array. The lens array can be either a diverging lens array or a converging lens array.

Both the ground-glass screen or lens array and the holographic optical imaging unit can be attached to the spectacles in a completely inconspicuous manner. The optical unit that generates the virtual image for the user is therefore inconspicuous and is not perceived as disturbing either by the user himself or by third parties. The holographic optical imaging unit can be applied to the lens as a coating. If one holographic optical imaging unit per lens and one ground-glass screen or lens array per eye are provided, a virtual stereo image can be superimposed on the field of vision of the user. Due to the arrangement of the holographic optical imaging unit close to the user's eye, the field of vision of the virtual image becomes particularly large for the user. In contrast to existing systems in which the surroundings are captured with a camera and, combined with the virtual image, are only visible to the user when the projection device is switched on, the surroundings always remain visible with the display apparatus according to the invention. The holographic optical imaging unit is transparent and inactive in the zero order. It therefore enables the user to perceive his surroundings unhindered and directly. The holographic optical imaging unit is preferably a thin flat element which is also preferably only a few micrometers thick and applied to the lens of the spectacles as a coating or film. The holographic optical imaging unit can comprise several holographic layers. Furthermore, the holographic optical imaging unit or its layers can each be optimized for a specific wavelength. As glass, any suitable transparent carrier for the holographic optical imaging unit can be considered. In particular, it should be noted that the glass may not necessarily be a mineral glass, but also, for example, a plastic glass. The ground-glass screen or lens array is also preferably designed as a thin flat element. Ground-glass screen and lens array can also be combined. The lens array can also be realized with a hologram.

Preferred embodiments of the present invention are subject matter of the dependent claims.

In a preferred embodiment of the present invention, the ground-glass screen or lens array is essentially aligned horizontally with the user's head upright. The main advantage of this embodiment is that the ground-glass screen or lens array does not disturb the field of vision of the user. Another advantage is that the ground-glass screen can be easily illuminated from above. Even when using a lens array, the projection device can be positioned above the user to create the image on the lens array. Preferably, the ground-glass screen or lens array is aligned essentially parallel to the visual axis so that it is barely or not visible to the user. It is also preferable in this context, if the ground-glass screen or lens array is located in the upper part of the spectacles so that the ground-glass screen or lens array is located at the upper end of the field of vision of the user.

In another preferred embodiment of the present invention, the ground-glass screen or lens array encloses an angle of at least 45° to a plane of the holographic optical imaging unit. Further preferably, the angle can be at least 60° to 90°.

In a further embodiment of the present invention, the holographic optical imaging unit comprises a reflection hologram and is arranged such that the light rays are incident on the holographic optical imaging unit through the ground-glass screen or lens array and reflected by said holographic optical imaging unit, thereby being transferred into the beam path that produces the virtual image for the user. The holographic optical imaging unit has the optical function of a magnifying glass. The holographic optical imaging unit of this embodiment preferably lies in a plane which encloses an angle of about 45° to the visual axis of the user. The holographic optical imaging unit thereby may either be applied to a spectacle lens that includes the required angle of about 45° to the visual axis. Naturally, it is also possible to provide an additional lens or a transparent disc to which the holographic optical imaging unit is applied in addition to a normally aligned spectacle lens. According to a particularly preferred further development of this embodiment, the ground-glass screen is designed as a holographic ground-glass screen with preferential light-emitting direction. This preferred form of a further development results in a significant improvement in efficiency compared to the use of a simple ground-glass screen.

In an alternative embodiment of the present invention, the holographic optical imaging unit comprises a transmission hologram, wherein the ground-glass screen is a holographic ground-glass screen with a preferential light-emitting direction so that the light rays from the ground-glass screen are predominantly directed onto the holographic optical imaging unit. With this embodiment, it is not necessary to provide an additional glass or transparent disc at a 45° angle to the visual axis of the user. The holographic optical imaging unit can be applied in a particularly inconspicuous way to a normally aligned spectacle lens. The transmission hologram preferably has at least one monochrome transmission hologram. Particularly preferably, the holographic optical imaging unit comprises at least three monochrome transmission holograms for light of different wavelengths, wherein the at least three monochrome transmission holograms are arranged one behind the other or one inside the other. The different transmission holograms can, for example, each be configured for one of the colors red, green and blue and, if necessary, another color. The projection device must be designed such that it produces light of the corresponding wavelengths. A further improvement in efficiency and thus a particularly clear representation of the virtual image is achieved, if the transmission hologram or holograms are designed as laser transmission holograms. Alternatively, it is also possible to use an ordinary laser light transmission hologram.

In another particularly preferred embodiment of the present invention, the projection device is designed as an external beamer independent of the spectacles. This embodiment offers the advantage that the spectacles are extremely light and therefore comfortable for the user. The electronics for calculating the image information can also be completely external. In order to produce a stereo image, either two beamers can be provided or one beamer is used which can display two images side by side. For example, the first image illuminates the ground-glass screen on the left side of the spectacles and the second image illuminates the ground-glass screen on the right side of the spectacles. If a lens array is used, the beamer is set up such that the image of the beamer is produced on the array. The beamer is preferably configured as a laser beamer. This achieves a high degree of efficiency and the virtual image achieves a particularly high color depth. The embodiment with beamer is suitable for applications where the user has limited freedom of movement. For example, this design can be used in the automotive sector. The beamer can, for example, be integrated into the ceiling of a motor vehicle. If a single beamer or stereo beamer pair is used, there is a freedom of movement of about 180° in relation to a head rotation around the vertical axis. Greater freedom of movement can be achieved by using several beamers, which are used depending on the position and orientation of the spectacles.

According to another preferred embodiment of the present invention, the display apparatus comprises a tracker for detecting the position and orientation of the spectacles, wherein the display apparatus is arranged such that the image produced by the beamer changes depending on the position and orientation of the spectacles. Passive tracking of the position and orientation of the spectacles is possible. This makes the spectacles particularly light. Alternatively, movement sensors can of course be accommodated in the spectacles to detect the position and orientation of the spectacles.

According to another particularly preferred embodiment of the present invention, the display device is set up such that an image section of the beamer, preferably limited to the ground-glass screen or lens array, moves with the ground-glass screen or lens array. This prevents the beamer from illuminating surfaces or areas whose illumination is perceived as disturbing either by the user himself or by other persons. In particular, this avoids unwanted glare effects. If the position and orientation of the glasses is not tracked, the beamer must cover a larger area so that the ground-glass screen or lens array is always in the illuminated area when the user changes position slightly.

According to a preferred embodiment, the tracker comprises a camera, wherein the spectacles are provided with reference points that can be captured by the camera. The reference points can be formed by light-emitting diodes to enable the position and orientation of the spectacles to be recorded even in the dark. In this case, a completely passive design of the spectacles is not possible, since a current source must be provided at least for the light emitting diodes. Alternatively, the reference points can also be coated with a phosphorescent material.

When using a ground-glass screen, the projection device may, in accordance with another embodiment of the present invention, comprise an LCD display, preferably located directly above the ground-glass screen and fixed to the spectacles. For the production of stereotropic virtual images, one LCD display per eye or ground-glass screen can of course be provided. This configuration offers the advantage that there are no limits to freedom of movement. A 360° panoramic view as well as changes in viewing angle upwards and downwards are possible with this embodiment. No eye tracking is required with this design either. Only the position and alignment of the spectacles must be recorded. As already described above, either a camera can be used to record the reference points on the spectacles. Alternatively, it is possible to detect the position and orientation of the spectacles by means of suitable sensors housed in the spectacles themselves.

The LCD display can be backlighted in various ways. Preferably, narrow-band LEDs or laser light sources are used for this purpose. In both cases, the image information can be composed, for example, by the basic colors red, green, blue and, if necessary, another color. The holographic optical imaging unit is adapted to the corresponding wavelengths of the colors mentioned. The LEDs, which are somewhat cheaper than laser light sources, above all offer a certain cost advantage. A better color depth can be achieved with laser light sources. Another option for backlighting the LCD display is the use of organic light-emitting diodes. If the spectacles are intended to be particularly light, it is also conceivable to provide an external illumination for the LCD display independently of the spectacles. Preferably, a laser is used for this purpose. Similar to the embodiment with a beamer described above, the external lighting can be adjusted such that the illuminated area with the ground-glass screen or LCD display moves with it. Of course, the position and orientation of the spectacles must be recorded. In the illuminated area of the spectacles, a photovoltaic cell can also be preferably arranged, through which batteries for the operation of the LCD display can be charged. Alternatively, the LCD display can also be supplied with power via a cable. For this, it is necessary to connect the spectacles to an external power supply using a power line. A combined data and power line can also be provided so that neither a radio receiver nor a computing unit for calculating the image information needs to be provided in the spectacles. In this case, despite the LCD display, the spectacles are particularly light and therefore comfortable to wear.

In another particularly preferred embodiment of the present invention, the display apparatus comprises a camera or a suitable alternative image recording device, the image of which, in processed or unprocessed form, can be superimposed as a virtual image into the field of vision of the user, the camera preferably being configured as a stereo camera. The camera is usually external. From the image of the stereo camera, a stereoscopic image can be calculated from the perspective of the user and superimposed on the real visual impression. This can be particularly advantageous, if the camera or a suitable alternative image capturing device captures details of reality that are not directly perceptible to the user, for example, because they are hidden by other objects. The term image recording device is to be interpreted broadly in this context. For example, it is conceivable for a surgeon to display a three-dimensional representation of certain tissue parts or vessels as a virtual image in his direct field of vision. In this case, an appropriate ultrasound or X-ray device can be used as the image capturing device.

The display device is particularly preferably designed for the user of a transport means, preferably for the driver of a motor vehicle, wherein the camera is positioned such that it detects areas of the surroundings which are otherwise not visible to the user, for example, because they are concealed, and wherein the display device is further preferably designed such that it calculates a stereoscopic image from the user's perspective from the image of the stereo camera so that for the user the real image of the surroundings is complemented with the virtual image to form an expanded image of the traffic situation. With this embodiment, for example, it is possible to capture the area of the surroundings behind the A-pillar as seen by the driver of a passenger car through the camera and to convert the image from the camera into a virtual image that can be displayed in the field of vision of the driver so that the driver can see through the A-pillar. The same applies, for example, to the bonnet or the B-pillar or C-pillar. Preferably, the areas that the user sees directly are excluded from the virtual image so that there is no disturbing overlapping of the direct visual impression with the virtual image in these areas.

In a further embodiment of the present invention, the camera can be an infrared camera. With this embodiment, the visibility can be considerably extended in poor visibility conditions, e.g. night/fog/rain.

In another preferred embodiment of the present invention, the display apparatus comprises a photometer for measuring ambient brightness. This allows the brightness of the virtual image to be adjusted to the ambient brightness.

In the following, embodiments of the present invention will be explained on the basis of the drawings.

Figure 2:
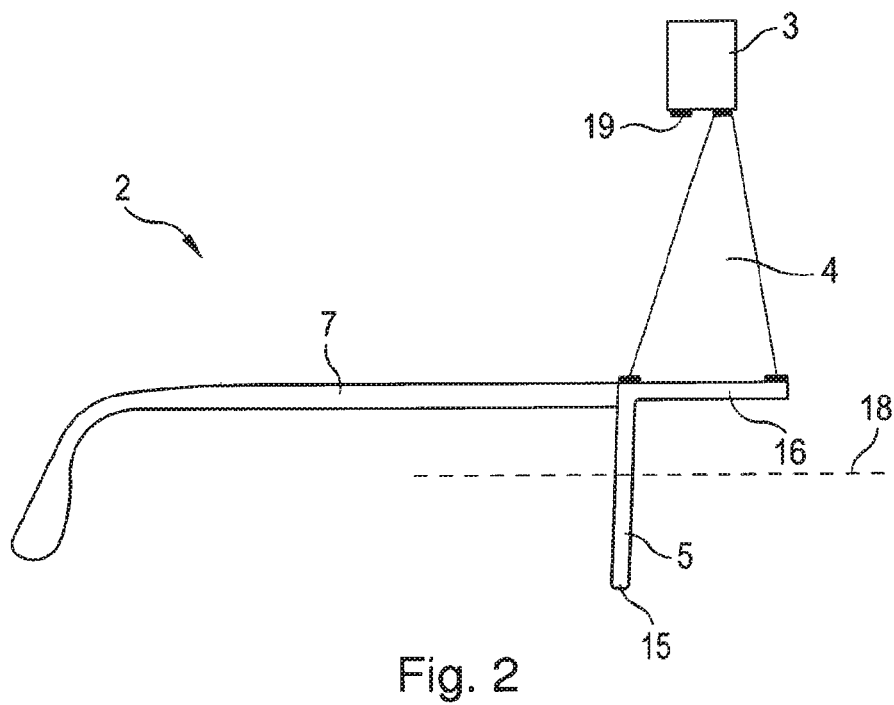
Figure 3:
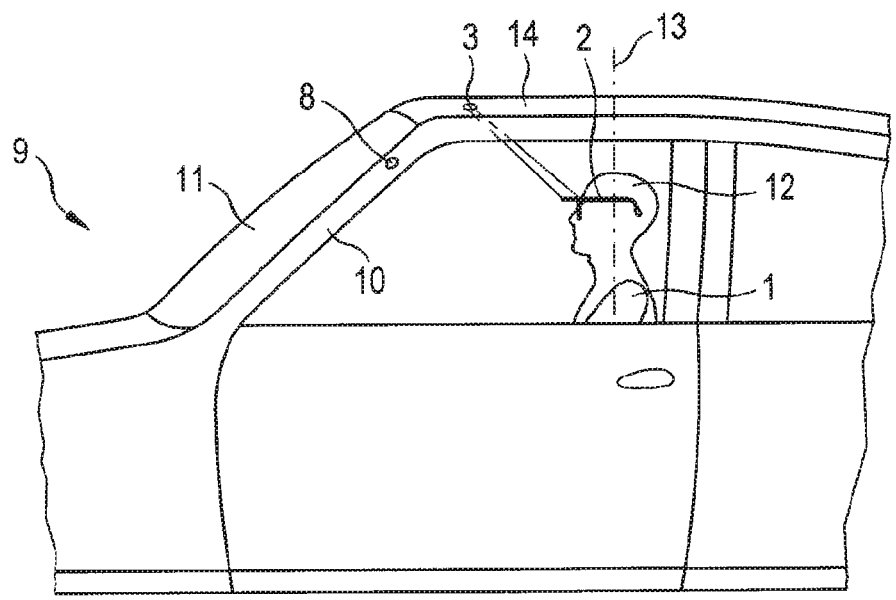
Figure 4:
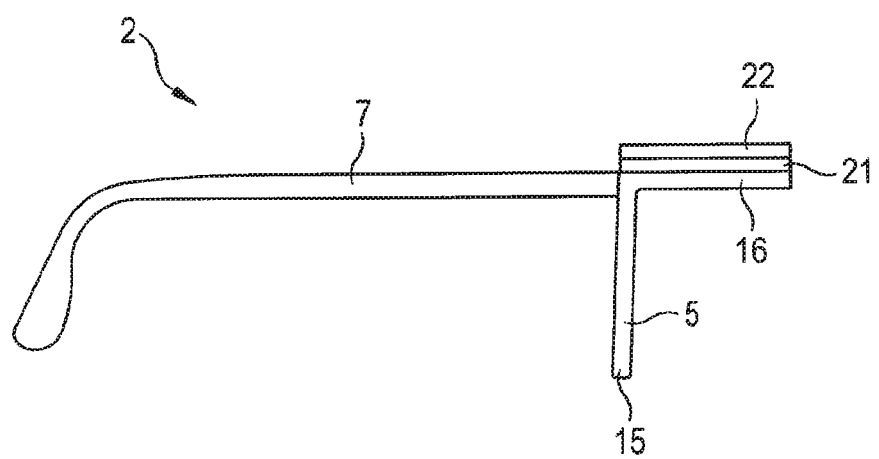
Figure 5:
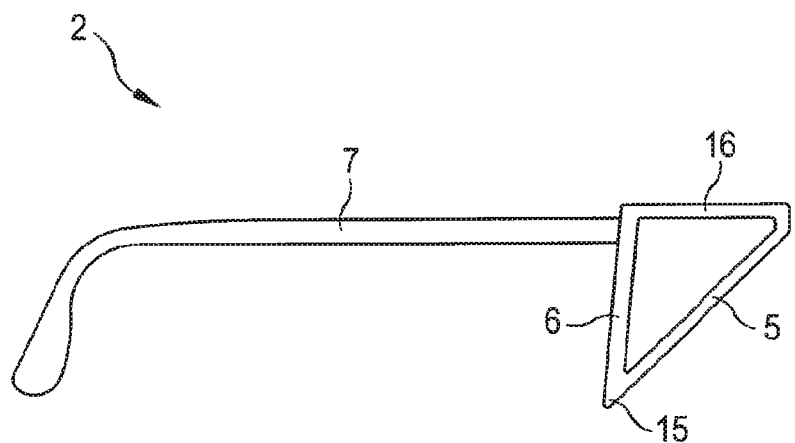
Figure 6:
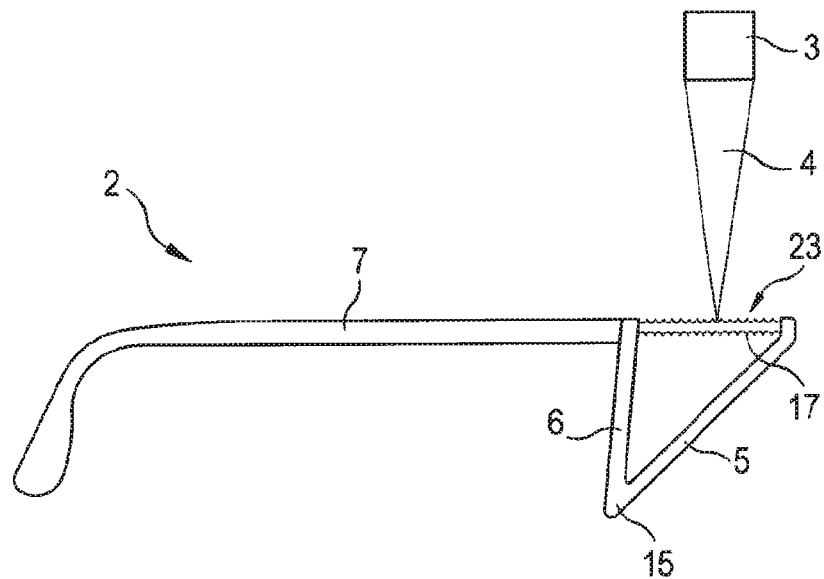

Therein:

FIG. 1: shows the spectacles of a display apparatus according to the invention according to a first embodiment in a perspective view, FIG. 2: shows the spectacles of FIG. 1 in a side view with a schematically shown external projection device, FIG. 3: a motor vehicle in a side view with the display apparatus in accordance with the invention according to the first embodiment, FIG. 4: a side view of the spectacles of a display apparatus in accordance with the invention according to a second embodiment with backlighted LCD display, FIG. 5: a side view of the spectacles of a display apparatus in accordance with the invention according to a third embodiment, and FIG. 6: a side view of the spectacles of a display apparatus in accordance with the invention according to a fourth embodiment.

For the following explanations it applies that identical parts are identified by identical reference signs. If a Figure contains reference signs which are not described in detail in the associated description of the Figures, reference is made to preceding or subsequent descriptions of the Figures. Furthermore, it is pointed out that the Figures are schematic in nature and only serve to explain the invention.

FIG. 1 shows a perspective view of spectacles 2 of a display apparatus in accordance with the invention according to a first embodiment. The spectacles 2 have a conventional frame 15 and two temples 7. The left glass 6L and the right glass 6R are inserted into the frame 15. The two glasses are each coated with a holographic optical imaging unit 5L or 5R, the function of which is explained below. In the embodiment in FIGS. 1 and 2, the holographic optical imaging unit 5 is configured as a transmission hologram. At the upper end of the frame, there is an additional frame in which two ground-glass screens 16L and 16R are inserted so that one ground-glass screen per glass is provided.

As can be seen from FIG. 2, the ground-glass screens 16 lie in a plane which is essentially parallel to the visual axis 18. Therefore and due to the position of the ground-glass screens in the upper part of the frame and thus at the upper end of the field of vision of the user, the ground-glass screens are not perceived as disturbing for the user.

As can also be seen from FIG. 2, the display apparatus in conformity with the invention also comprises a projection device 3 which, in the example shown, is configured as an external beamer. The light rays 4 produced by the beamer 3 are incident from above on the ground-glass screen 16. The light is scattered through the ground-glass screen and subsequently is incident on the holographic optical imaging unit 5, from which the light is transferred into the beam path which produces a virtual image for the user. An important advantage of this invention is that the surroundings remain directly visible to the user and the virtual image is only superimposed on reality.

In order to ensure that the correct image information is always superimposed on the user when he moves his head, the position and orientation of the spectacles must be captured. For this purpose, the frame 15 of the spectacles 2 has at least three reference points 20 in the upper area, which can be captured by the camera 19 of a tracker shown schematically in FIG. 2.

FIG. 3 shows an application of the spectacles from FIGS. 1 and 2. Here, the spectacles 2 are part of a display apparatus according to the invention, which is integrated into a motor vehicle 9. In FIG. 3, the driver 1 looks straight through the windscreen 11 of the motor vehicle 9 to the traffic situation. In a purely real perception of the surroundings, certain areas of the traffic situation are covered by the A-pillar 10 of the motor vehicle 9. In order to make these areas visible to the driver, a camera 8 is provided in the A-pillar 10, the image of which is converted from the perspective of driver 1 by means of a corresponding computing unit and superimposed to the driver as a virtual image in his field of vision. As a projection device, a beamer 3 is used, which is integrated into the ceiling 14 of the vehicle interior. At this point, it is pointed out once more that the illustrations are only schematic in nature. The camera 8 is preferably designed as a stereo camera so that the driver can see a three-dimensional image of the area behind the A-pillar. It should also be noted that the camera 8 must be located in the A-pillar.

In the embodiment shown, the driver can turn his head 12 about the vertical axis 13 by about 180°. The corresponding image section which is projected by the beamer 3 onto the ground-glass screen of the spectacles can be tracked accordingly, or the image covers the entire movement space so that no tracking is necessary. The position and orientation of the spectacles are recorded by a tracker that is not shown in detail. Alternatively, as already described, it is also conceivable to provide corresponding movement sensors in the spectacles 2.

Instead of the beamer shown in FIGS. 2 and 3, another projection device may be used to produce the light rays. FIG. 4 shows another embodiment of this. The illustration essentially corresponds to the illustration from FIG. 2. The spectacles of a display device according to the invention are shown here again in side view. Instead of the beamer 3 schematically drawn in FIG. 2, an LCD display 21 with corresponding LED backlight 22 is provided here. The projection device consisting of LCD display and LED backlighting is arranged as a unit directly above the ground-glass screen 16 and securely connected to the frame 15 of the spectacles 2. In this embodiment, the spectacles 2 are a little heavier, however, the user is in no way restricted in his freedom of movement. In order to superimpose the correct image section of the virtual image on the user, the position and orientation of the spectacles must be captured. Here, too, passive detection can be achieved by means of corresponding reference points on the spectacles and a corresponding camera system. Alternatively, suitable sensors can be provided in the spectacles.

FIG. 5 shows a side view of spectacles according to another embodiment. In contrast to the frame in FIG. 2, a third plane is provided here which extends from the front end of the ground-glass screen 16 at an angle of approximately 45° to the lower end of the spectacle lens 6. In this embodiment, the holographic optical imaging unit 5 lies in this plane. In contrast to the embodiment in FIG. 2, the holographic optical imaging unit is not configured as a transmission hologram but as a reflection hologram. The hologram can be applied to a transparent disc. It should be noted that in this embodiment, it is in principle also possible to dispense with the spectacle lens 6. The image production can be done in several ways, especially as in FIG. 2 or as in FIG. 4.

FIG. 6 shows a variant in which the ground-glass screen 16 is replaced by a lens array 17. The lens array 17 is made of plastic for a particularly light version of the spectacles. This embodiment also uses a beamer 3 which projects an image onto the lens array 17. The image plane 23 is thus located on the lens array 17.

The invention claimed is:

1. A display apparatus for superimposing a virtual image into the field of vision of a user of the display apparatus, comprising:
    spectacles for the user, the spectacles having an optical unit comprising a ground-glass screen and a holographic optical imaging unit;
    at least one projection device for producing light rays which are transferred by the optical unit of the spectacles into a beam path which produces the virtual image for the user;
    wherein the ground-glass screen and the holographic optical imaging unit are arranged in such a way that the light rays produced by the projection device are incident on the holographic optical imaging unit through the ground-glass screen and are transferred from the holographic optical imaging unit into the beam path which produces the virtual image for the user; and
    wherein the ground-glass screen is arranged in the upper region of the spectacles so that the ground-glass screen is located at the upper end of the field of vision of the user, the ground-glass screen encloses an angle of at least 45 degrees to a plane of the holographic optical imaging unit, the holographic optical imaging unit is transparent and inactive in the zero order and therefore enables the user to perceive the surroundings in a direct and unhindered manner.

2. The display apparatus according to claim 1, wherein the ground-glass screen is oriented substantially horizontally with the user's head held upright.

3. The display apparatus according to claim 1, wherein the holographic optical imaging unit comprises a reflection hologram and is arranged in such a way that the light rays are incident on the holographic optical imaging unit through the ground-glass screen and are reflected by the holographic optical imaging unit and, thereby, are transferred into the beam path which produces the virtual image for the user.

4. The display apparatus according to claim 3, wherein the ground-glass screen is a holographic ground-glass screen with a preferential light-emitting direction.

5. The display apparatus according claim 1, wherein the holographic optical imaging unit comprises a transmission hologram, wherein the ground-glass screen is a holographic ground-glass screen with a preferential light-emitting direction so that the light rays from the ground-glass screen are directed predominantly onto the holographic optical imaging unit.

6. The display apparatus according to claim 5, wherein the holographic optical imaging unit comprises at least three monochrome transmission holograms for light of different wavelengths, wherein the at least three monochrome transmission holograms are arranged one behind the other or one inside the other.

7. The display apparatus according to claim 1, wherein the projection device is configured as an external beamer independently of the spectacles.

8. The display apparatus according to claim 7, wherein the display apparatus comprises a tracker for detecting the position and orientation of the spectacles, wherein the display apparatus is adapted in such a way that the image produced by the beamer changes depending on the position and orientation of the spectacles.

9. The display apparatus according to claim 8, wherein the display apparatus is adapted in such a way that an image section which is limited to the ground-glass screen moves with the ground-glass screen.

10. The display apparatus according to claim 8, wherein that the tracker comprises a camera, wherein the spectacles are provided with reference points which can be detected by the camera.

11. The display apparatus according to claim 1, wherein the projection device comprises an LCD display which is arranged directly above the ground-glass screen and is securely connected to the spectacles.

12. The display apparatus according to claim 11, wherein the spectacles have narrow-band LEDs or laser light sources for backlighting the LCD display.

13. The display apparatus according to claim 11, wherein the projection device has an external illumination for the LCD display provided independently of the spectacles.

14. The display apparatus according to claim 1, further including an image-capturing device configured as a stereo camera, an image of image-capturing device, in processed or unprocessed form, is superimposed as a virtual image into the field of vision of the user.

15. The display apparatus according to claim 14, wherein the display apparatus is designed for the user of a vehicle, wherein the camera is positioned for detecting areas of the surroundings which are not otherwise visible to the user, and wherein the display apparatus is further adapted to calculate a stereoscopic image from the user's perspective from the image of the stereo camera so that, for the user, the real image of the surroundings is complemented with the virtual image to form an expanded image of the traffic situation so that for the user, the virtual image of the surroundings is complemented to form an expanded image of the traffic situation.

16. A display apparatus for superimposing a virtual image into the field of vision of a user of the display apparatus, comprising:
    spectacles for the user, the spectacles having an optical unit comprising a lens array and a holographic optical imaging unit;
    at least one projection device for producing light rays which are transferred by the optical unit of the spectacles into a beam path which produces the virtual image for the user; and
    wherein the lens array and the holographic optical imaging unit are arranged in such a way that the light rays produced by the projection device are incident on the holographic optical imaging unit through the lens array and are transferred by the holographic optical imaging unit into the beam path which produces the virtual image for the user,
    wherein the lens array is arranged in the upper region of the spectacles so that the lens array is located at the upper end of the field of vision of the user, the lens array encloses an angle of at least 45 degrees to a plane of the holographic optical imaging unit, wherein the holographic optical imaging unit is transparent and inactive in the zero order and therefore enables the user to perceive the surroundings in a direct and unhindered manner.

17. The display apparatus according to claim 16, wherein the lens array is oriented substantially horizontally with the user's head held upright.

18. The display apparatus according to claim 17, wherein the holographic optical imaging unit comprises a reflection hologram and is arranged in such a way that the light rays are incident on the holographic optical imaging unit through the lens array and are reflected by the holographic optical imaging unit and, thereby, are transferred into the beam path which produces the virtual image for the user.

19. The display apparatus according to claim 16, wherein the projection device is configured as an external beamer independently of the spectacles.

20. The display apparatus according to claim 19, wherein the display apparatus comprises a tracker for detecting the position and orientation of the spectacles, wherein the display apparatus is adapted in such a way that the image produced by the beamer changes depending on the position and orientation of the spectacles.

\* \* \* \* \*